United States Patent
Takizawa et al.

(10) Patent No.: US 10,962,948 B2
(45) Date of Patent: Mar. 30, 2021

(54) POWER SYSTEM, ENERGY SYSTEM, ENERGY EXCHANGE METHOD, PROGRAM, TERMINAL, AND MOBILE OBJECT

(71) Applicant: HONDA MOTOR CO., LTD., Tokyo (JP)

(72) Inventors: Daijiro Takizawa, Saitama (JP); Hidekazu Saito, Saitama (JP); Ken Hanayama, Saitama (JP); Kanako Ikeda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/955,780

(22) PCT Filed: Dec. 20, 2018

(86) PCT No.: PCT/JP2018/046910
§ 371 (c)(1),
(2) Date: Jun. 19, 2020

(87) PCT Pub. No.: WO2019/124479
PCT Pub. Date: Jun. 27, 2019

(65) Prior Publication Data
US 2020/0341441 A1    Oct. 29, 2020

(30) Foreign Application Priority Data

Dec. 21, 2017    (JP) .............................. JP2017-245057

(51) Int. Cl.
*G05B 19/042*    (2006.01)

(52) U.S. Cl.
CPC .... *G05B 19/042* (2013.01); *G05B 2219/2639* (2013.01)

(58) Field of Classification Search
CPC ..... Y02T 10/70; Y02T 90/12; Y02T 10/7072; Y02T 90/16; B64C 39/024;
(Continued)

(56) References Cited

U.S. PATENT DOCUMENTS 8,855,829 B2 * 10/2014 Golden .................. H04L 67/10
700/291
9,600,790 B2 *  3/2017 Mohagheghi ............ H02J 3/38
(Continued)

FOREIGN PATENT DOCUMENTS

EP        2752954 A1     7/2014
JP     2003324850 A    11/2003
(Continued)

OTHER PUBLICATIONS (ISA/237) Written Opinion of the International Search Authority for International Patent Application No. PCT/JP2018/046910, mailed by the Japan Patent Office dated Jan. 29, 2019.
(Continued)

*Primary Examiner* — Darrin D Dunn

(57) ABSTRACT

An energy system is provided, including: a first placement unit for removably placing a mobile energy storage device capable of storing energy or energy sources; a second placement unit for removably placing the mobile energy storage device; an abnormality acquiring unit for acquiring an abnormality on an energy path used for energy exchange, the energy path built between a first energy consumer having the first placement unit and a first energy consuming device, and a second energy consumer having the second placement unit and a second energy consuming device; a mobile object for autonomously moving with the mobile energy storage device loaded thereon, so as to remove the mobile energy storage device from the first placement unit and place the mobile energy storage device on the second placement unit, if the abnormality acquiring unit acquires an abnormality
(Continued)

when the mobile energy storage device is placed on the first placement unit.

14 Claims, 8 Drawing Sheets

(58) Field of Classification Search
CPC ........ B64C 2201/128; B64C 2201/141; B64C 2201/027; B64C 2201/066; B64C 2201/146; B60L 53/80; B60L 53/63; B60L 2200/10; B60L 53/126; B60L 53/68; B60L 55/00; B60L 1/00; Y04S 10/52; Y04S 20/222; Y04S 40/121
See application file for complete search history.

(56) References Cited

U.S. PATENT DOCUMENTS

| | | | |
|---|---|---|---|
| 2005/0040809 A1* | 2/2005 | Uber, III | G01R 15/142 324/117 R |
| 2014/0032034 A1 | 1/2014 | Raptopoulos | |
| 2015/0280465 A1* | 10/2015 | Lin | B60L 3/0046 320/137 |
| 2017/0355354 A1* | 12/2017 | Hassounah | B60L 53/80 |
| 2018/0009330 A1* | 1/2018 | Ricci | B60R 1/00 |
| 2018/0141453 A1* | 5/2018 | High | G08G 5/0026 |
| 2019/0347924 A1* | 11/2019 | Trundle | B60L 53/305 |

FOREIGN PATENT DOCUMENTS

| | | |
|---|---|---|
| JP | 2017118604 A | 6/2017 |
| JP | 2017195722 A | 10/2017 |
| WO | 2015061008 A1 | 4/2015 |

OTHER PUBLICATIONS

Decision to Grant a Patent issued for counterpart Japanese Application No. 2019-524282, drafted by the Japan Patent Office on Jul. 9, 2019 (drafted on Jul. 3, 2019).

Partial Supplemental European Search Report for European Patent Application No. 18893258.6, issued by the European Patent Office dated Jan. 21, 2021.

* cited by examiner

POWER SYSTEM, ENERGY SYSTEM, ENERGY EXCHANGE METHOD, PROGRAM, TERMINAL, AND MOBILE OBJECT

CROSS REFERENCE TO RELATED APPLICATIONS

This is a continuation application of International Application No. PCT/JP2018/046910 filed on Dec. 20, 2018, which claims priority to Japanese Patent Application No. 2017-245057 filed on Dec. 21, 2017, the contents of each of which are incorporated herein by reference.

BACKGROUND

1. Technical Field

The present invention relates to a power system, an energy system, an energy exchange method, a program, a terminal, and a mobile object.

2. Related Art

A power demand-and-supply adjusting system has been known for controlling power transmission or power reception between power consumers (for example, refer to Patent Literature 1).

PRIOR ART LITERATURE

Patent Literature

[Patent Literature 1] Japanese Unexamined Patent Application Publication No. 2003-324850.

Technical Problem

It is preferable to provide a technology capable of appropriately performing exchange of energy such as electric power.

General Disclosure

According to a first aspect of the present invention, a power system is provided. The power system may include a first placement unit for removably placing a mobile power storage device capable of storing electric power. The power system may include a second placement unit for removably placing the mobile power storage device. The power system may include an abnormality acquiring unit for acquiring an abnormality on a power line used for power exchange, which is built between a first power consumer having the first placement unit and a first power consuming device for consuming electric power, and a second power consumer having the second placement unit and a second power consuming device. The power system may include a mobile object for autonomously moving with the mobile power storage device loaded thereon, so as to remove the mobile power storage device from the first placement unit and place the mobile power storage device on the second placement unit when the abnormality acquiring unit acquires an abnormality in a case that the mobile power storage device is placed on the first placement unit.

The first power consumer may have a stationary power storage device settled on the first power consumer, rather than the mobile power storage device. The mobile object may move with the mobile power storage device loaded thereon, in a disconnected condition where the power system is not connected to a utility grid.

According to a second aspect of the present invention, a power system is provided. The power system may include a first placement unit for removably placing a mobile power storage device capable of storing electric power. The power system may include a second placement unit for removably placing the mobile power storage device. The power system may include an abnormality acquiring unit for acquiring an abnormality on a power line used for power exchange, which is built between a power supplier having the first placement unit and a power generation device for generating electric power, and a power consumer having the second placement unit and a power consuming device for consuming electric power. The power system may include a mobile object for autonomously moving with the mobile power storage device loaded thereon, so as to remove the mobile power storage device from the first placement unit and place the mobile power storage device on the second placement unit when the abnormality acquiring unit acquires an abnormality.

According to a third aspect of the present invention, an energy system is provided. The energy system may include a first placement unit for removably placing a mobile energy storage device capable of storing energy or energy sources. The energy system may include a second placement unit for removably placing the mobile energy storage device. The energy system may include an abnormality acquiring unit for acquiring an abnormality on an energy path used for energy exchange, which is built between a first energy consumer having the first placement unit and a first energy consuming device for consuming energy, and a second energy consumer having the second placement unit and a second energy consuming device. The energy system may include a mobile object for autonomously moving with the mobile energy storage device loaded thereon, so as to remove the mobile energy storage device from the first placement unit and place the mobile energy storage device on the second placement unit when the abnormality acquiring unit acquires an abnormality in a case that the mobile energy storage device is placed on the first placement unit.

According to a fourth aspect of the present invention, an energy exchange method is provided. The energy exchange method may include: acquiring an abnormality on an energy path used for energy exchange, which is built between a first energy consumer having a first placement unit for removably placing a mobile energy storage device capable of storing energy or energy sources and a first energy consuming device for consuming energy, and a second energy consumer having a second placement unit for removably placing the mobile energy storage device and a second energy consuming device. The energy exchange method may include: causing, a mobile object for autonomously moving with the mobile energy storage device loaded thereon, to remove the mobile energy storage device from the first placement unit, when an abnormality is acquired in a case that the mobile energy storage device is placed on the first placement unit; and causing the mobile object to place the mobile energy storage device on the second placement unit.

According to a fifth aspect of the present invention, a program for causing a computer to execute the energy exchange method may be provided.

According to a sixth aspect of the present invention, a power system is provided. The power system may include a first placement unit for removably placing a mobile power storage device capable of storing electric power. The power system may include a second placement unit for removably placing the mobile power storage device. The power system may include a third placement unit for removably placing the mobile power storage device. The power system may include: an aggregation device for aggregating power supply-and-demand, which is communicably connected to a first power consumer having a first placement unit and a first power consuming device for consuming electric power, and a second power consumer having a second placement unit and a second power consuming device; and a mobile object. The aggregation device may have an information acquiring unit for acquiring first exchange information including information about a cost or a loss in a case that a power supplier and the first power consumer exchange electric power, and second exchange information including information about a cost or a loss in a case that the power supplier and the second power consumer exchange electric power. The aggregation device may have a receiver determination unit for determining a power receiver that receives electric power via the mobile power storage device, based on the first exchange information and the second exchange information acquired by the information acquiring unit. The mobile object may autonomously move with the mobile power storage device loaded thereon, so as to remove the mobile power storage device from the third placement unit and place the mobile power storage device on the second placement unit when the receiver determination unit determines the second power consumer as a power receiver.

In the power system, the first exchange information may include information about a cost or a loss in a case that the power supplier and the first power consumer exchange electric power via the mobile power storage device, and the second exchange information may include information about a cost or a loss in a case that the power supplier and the second power consumer exchange electric power via the mobile power storage device. The first exchange information may include first consideration-for-reception information indicating consideration that the first power consumer pays when receiving electric power, and the second exchange information may include second consideration-for-reception information indicating consideration that the second power consumer pays when receiving electric power. The first exchange information and the second exchange information may include consideration-for-transfer information indicating consideration that the power supplier receives when transferring electric power.

According to a seventh aspect of the present invention, an energy system is provided. The energy system may include a first placement unit for removably placing a mobile energy storage device capable of storing energy or energy sources. The energy system may include a second placement unit for removably placing the mobile energy storage device. The energy system may include a third placement unit for removably placing the mobile energy storage device. The energy system is communicably connected to: a first energy consumer having a first placement unit and a first energy consuming device for consuming energy; a second energy consumer having a second placement unit and a second energy consuming device; and an energy supplier having at least any of an energy generation device for generating energy or energy sources and an energy storage device for storing energy or energy sources, and a third placement unit; and the energy system may include: an aggregation device for aggregating energy supply-and-demand; and a mobile object. The aggregation device may have an information acquiring unit for acquiring first exchange information including information about a cost or a loss in a case that an energy supplier and the first energy consumer exchange energy, and second exchange information including information about a cost or a loss in a case that the energy supplier and the second energy consumer exchange energy or energy sources. The aggregation device may have a receiver determination unit for determining an energy receiver that receives energy or energy sources via the mobile energy storage device, based on the first exchange information and the second exchange information acquired by the information acquiring unit. The mobile object may autonomously move with the mobile energy storage device loaded thereon, so as to remove the mobile energy storage device from the third placement unit and place the mobile energy storage device on the second placement unit when the receiver determination unit determines the second energy consumer as an energy receiver.

According to an eighth aspect of the present invention, an energy exchange method is provided. The energy exchange method may include acquiring the following: first exchange information including information about a cost or a loss in a case that a first energy consumer having a first placement unit for removably placing a mobile energy storage device capable of storing energy or energy sources and a first energy consuming device for consuming energy, and an energy supplier having at least any of an energy generation device for generating energy or energy sources and an energy storage device for storing energy or energy sources, and a third placement unit for removably placing a mobile energy storage device exchange energy or energy sources; and second exchange information including information about a cost or a loss, in a case that a second energy consumer having a second placement unit for removably placing a mobile energy storage device and a second energy consuming device and an energy supplier exchange energy or energy sources. The energy exchange method may include: determining an energy receiver that receives energy or energy sources via the mobile energy storage device, based on the first exchange information and the second exchange information. The energy exchange method may include: when the second energy consumer is determined as an energy receiver, causing, a mobile object for autonomously moving with the mobile energy storage device loaded thereon, to remove the mobile energy storage device from the third placement unit; and causing a mobile object to place the mobile energy storage device on a second placement unit.

According to a ninth aspect of the present invention, a program for causing a computer to perform the energy exchange method is provided.

According to a tenth aspect of the present invention, a server is provided. The server may include an information acquiring unit for acquiring the following: first exchange information including information about a cost or a loss in a case that a first energy consumer having a first placement unit for removably placing a mobile energy storage device capable of storing energy or energy sources and a first energy consuming device for consuming energy, and an energy supplier having at least any of an energy generation device for generating energy or energy sources and an energy storage device for storing energy or energy sources, and a third placement unit for removably placing a mobile energy storage device exchange energy or energy sources; and second exchange information including information about a cost or a loss, in a case that a second energy consumer having a second placement unit for removably placing a mobile energy storage device and a second energy consuming device and an energy supplier exchange energy or energy sources. The server may include a receiver determination unit for determining an energy receiver that receives energy or energy sources via the mobile energy storage device, based on the first exchange information and the second exchange information. The server may include a mobile object controlling unit for causing, a mobile object for autonomously moving with the mobile energy storage device loaded thereon, to remove the mobile energy storage device from the third placement unit, and causing the second placement unit to place the mobile energy storage device, when the second energy consumer is determined as an energy receiver.

According to an eleventh aspect of the present invention, an energy exchange method is provided. The energy exchange method may include providing exchange information including information about a cost or a loss in exchanging energy or energy sources to: an energy supplier having at least any of an energy generation device for generating energy or energy sources and an energy storage device for storing energy or energy sources, and a placement unit for removably placing a mobile energy storage device capable of storing energy or energy sources; or an energy aggregator that aggregates supply-and-demand of energy or energy sources. The energy exchange method may include accepting, from a mobile object for autonomously moving with the mobile energy storage device loaded thereon, the mobile energy storage device removed from the placement unit of the energy supplier by the mobile object, in response to a target receiving energy or energy sources via the mobile energy storage device having been determined based on the exchange information.

According to twelfth aspect of the present invention, an energy exchange method is provided. The energy exchange method may include acquiring, by an energy supplier having: at least any of an energy generation device for generating energy or energy sources and an energy storage device for storing energy or energy sources; and a supplier placement unit for removably placing a mobile energy storage device capable of storing energy or energy sources, first exchange information including information about a cost or a loss in a case that a first energy consumer and an energy supplier exchange energy or energy sources from a first energy consumer having a first placement unit for removably placing a mobile energy storage device and a first energy consuming device for consuming energy. The energy exchange method may include acquiring, by the energy supplier, second exchange information including information about a cost or a loss in a case that a second energy consumer and the energy supplier exchange energy or energy sources, from the second energy consumer having: a second placement unit for removably placing the mobile energy storage device; and a second energy consuming device. The energy exchange method may include determining, by the energy supplier based on the first exchange information and the second exchange information, the second energy consumer as a target that receives energy or energy sources via the mobile energy storage device. The energy exchange method may include: causing by the energy supplier, a mobile object for autonomously moving with the mobile energy storage device loaded thereon, to remove the mobile energy storage device from the supplier placement unit; and causing the mobile object to place the mobile energy storage device on the second placement unit.

According to a thirteenth aspect of the present invention, a terminal is provided, the terminal included in an energy supplier having at least any of an energy generation device for generating energy or energy sources and an energy storage device for storing energy or energy sources, and a supplier placement unit for removably placing a mobile energy storage device capable of storing energy or energy sources. The terminal may include an exchange information acquiring unit for acquiring first exchange information including information about a cost or a loss in a case that a first energy consumer and an energy supplier exchange energy or energy sources from the first energy consumer having a first placement unit for removably placing a mobile energy storage device and a first energy consuming device for consuming energy, and acquiring second exchange information including information about a cost or a loss in a case that a second energy consumer and the energy supplier exchange energy or energy sources from the second energy consumer having a second placement unit for removably placing the mobile energy storage device and a second energy consuming device. The terminal may include a receiver determination unit for determining an energy receiver that receives energy or energy sources via the mobile energy storage device, based on the first exchange information and the second exchange information. The terminal may include a mobile object controlling unit for causing, a mobile object for autonomously moving with the mobile energy storage device loaded thereon, to remove the mobile energy storage device from the supplier placement unit and place the mobile energy storage device on the second placement unit.

According to a fourteenth aspect of the present invention, a mobile object is provided. The mobile object may autonomously move with the mobile energy storage device loaded thereon, so as to remove a mobile energy storage device from a third placement unit and place the mobile energy storage device on a second placement unit, when a second energy consumer is determined as an energy receiver receiving energy or energy sources via the mobile energy storage device, based on: first exchange information including information about a cost or a loss in a case that a first energy consumer having a first placement unit for removably placing a mobile energy storage device capable of storing energy or energy sources and a first energy consuming device for consuming energy, and an energy supplier having at least any of an energy generation device for generating energy or energy sources and an energy storage device for storing energy or energy sources and a third placement unit for removably placing the mobile energy storage device, exchange energy or energy sources; and second exchange information including information about a cost or a loss in a case that a second energy consumer having a second placement unit for removably placing the mobile energy storage device and a second energy consuming device, and an energy supplier exchange energy or energy sources.

Note that the summary clause does not necessarily describe all necessary features of the present invention. The present invention may also include sub-combinations of the features described above.

DESCRIPTION OF EXEMPLARY EMBODIMENTS

The following will describe the present invention through embodiments of the invention, but the embodiments below do not limit the invention according to the claims. In addition, not all the combinations of features described in the embodiments are necessarily required in solutions of the invention.

Figure 1:
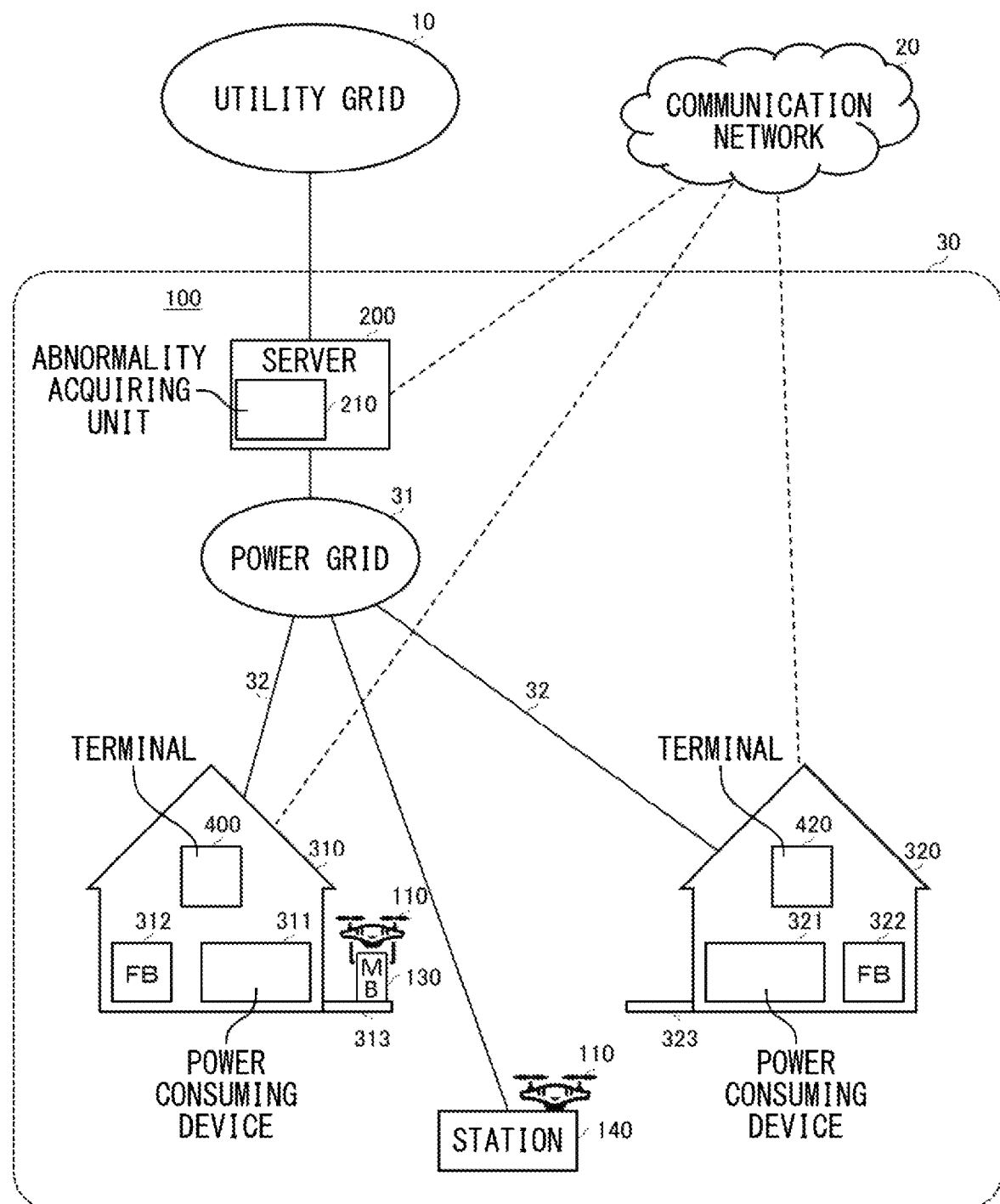
FIG. 1 schematically illustrates an example of a power system 100.

FIG. 1 schematically illustrates an example of a power system 100. The power system 100 illustrated in FIG. 1 includes: an abnormality acquiring unit for acquiring an abnormality on a power line used for power exchange, the power line built between a plurality of power consumers within a community (such as a CEMS (Community Energy Management System)); and a mobile object for autonomously moving among the plurality of power consumers with a mobile power storage device capable of storing electric power loaded thereon, for example. When the abnormality acquiring unit acquires an abnormality on the power line, the mobile object transports the mobile power storage device among the power consumers, so that power exchange among the power consumers can be performed even if an abnormality occurs on the power line.

FIG. 1 illustrates an example in which an unmanned aircraft 110 transports an MB (Mobile Battery) 130 between a power consumer 310 and a power consumer 320 in the CEMS 30. The number of power consumers in the CEMS 30 is not limited thereto, and more power consumers may be included in the CEMS 30. The unmanned aircraft 110 is, for example, a drone. The unmanned aircraft 110 is an example of a mobile object. The MB 130 is an example of a mobile power storage device.

The CEMS 30 includes a power grid 31, the power consumer 310, the power consumer 320, a server 200, a station 140, and the unmanned aircraft 110. The power grid 31 includes power lines 32 connected to a plurality of power consumers in the CEMS 30. The power consumer 310 and the power consumer 320 are capable of exchanging electric power via the power lines 32 of the power grid 31. Note that the power consumer 310 and the power consumer 320 may be directly connected through the power line 32 without being connected via the power grid 31.

The power consumer 310 and the power consumer 320 may be so-called low-voltage consumers such as general households. Further, the power consumer 310 and the power consumer 320 may be so-called high-voltage and low-volume consumers or may be so-called high-voltage and high-volume consumers.

The power consumer 310 has a power consuming device 311. The power consuming device 311 may be a device consuming electric power, such as a consumer electronics device. In addition, the power consumer 310 may have a stationary power storage device settled in the power consumer 310, rather than the MB 130. An FB (Fixed Battery) 312 shown in FIG. 1 is an example of the stationary power storage device. The FB 312 supplies electric power to the power consuming device 311.

The power consumer 310 has a placement unit 313 for removably placing the MB 130. Only one ME 130 may be placeable on the placement unit 313. In addition, a plurality of MBs 130 may also be placeable on the placement unit 313. When the MB 130 is placed on the placement unit 313, the MB 130 and the power consuming device 311 are electrically connected, so that the power consuming device 311 can receive electric power from the MB 130. Energization between the MB 130 and the placement unit 313 may be a contact-type energization in which a terminal of the MB 130 and a terminal of the placement unit 313 are contacted. When the contact-type energization is used, that the MB 130 is removably placed on the placement unit 313 may be that the MB 130 is placed so that the terminal of the MB 130 and the terminal of the placement unit 313 are contacted. The energization between the MB 130 and the placement unit 313 may be a non-contact-type energization. When the non-contact-type energization is used, that the MB 130 is removably placed on the placement unit 313 may be that the MB 130 is placed in any arrangement enabling the MB 130 and the placement unit 313 to perform the non-contact-type energization. The energization between the MB 130 and the placement unit 313 may be a contactless energization. When the contactless energization is used, that the MB 130 is removably placed on the placement unit 313 may be that the MB 130 is placed in any arrangement enabling the MB 130 and the placement unit 313 to perform the contactless energization.

The power consuming device 311 may receive electric power from both the FB 312 and the MB 130 placed on the placement unit 313. In this case, even if the MB 130 is removed from the placement unit 313, supplying electric power to the power consuming device 311 continues with the FB 312.

The power consuming device 311 may receive electric power from any one of the FB 312 and the MB 130 placed on the placement unit 313. For example, when the power consuming device 311 is receiving electric power from the MB 130, if the MB 130 is removed from the placement unit 313, the power supply source to the power consuming device 311 may be switched from the MB 130 to the FB 312. This enables power supply to the power consuming device 311 to be continued.

The power consumer 320 has a power consuming device 321, an FB 322, and a placement unit 323. The power consuming device 321 may be similar to the power consuming device 311. The FB 322 may be similar to the FB 312. The placement unit 323 may be similar to the placement unit 313.

The power consumer 310 supplies electric power of the FB 312 to the power consumer 320 via the power grid 31, for example. In addition, the power consumer 310 supplies electric power of the MB 130 to the power consumer 320 via the power grid 31, when the MB 130 is placed on the placement unit 313, for example. Electric power supplied from the power consumer 310 to the power consumer 320 may be supplied to the power consuming device 321 or may be stored in the FB 322.

The server 200 may be connected to a utility grid 10, as shown in FIG. 1. The server 200 may manage electric power in the CEMS 30. The server 200 may be an example of an aggregation device for aggregating power supply-and-demand between a plurality of power receivers. The server 200 is provided by power aggregators that aggregate electricity supply-and-demand in the CEMS 30, for example. The power aggregator may be referred to as an aggregator.

In the example shown in FIG. 1, the server 200 has an abnormality acquiring unit 210 for acquiring an abnormality on the power line 32. The abnormality on the power line 32 refers to, for example, a condition in which power transmission via the power line 32 is impossible, a condition in which a transmission loss of power transmission vis the power line 32 is higher than usual, and so on. The abnormality on the power line 32 refers to, for example, disconnection of the power line 32. In addition, the abnormality on power line 32 refers to, for example, imperfection of the power line 32 such as damage on the power line 32. The abnormality acquiring unit 210 detects, for example, an abnormality on the power line 32. In addition, the abnormality acquiring unit 210 estimates, for example, an abnormality on the power line 32.

The abnormality acquiring unit 210 may acquire an abnormality on the power line 32 by using any approach. For example, the abnormality acquiring unit 210 acquires an abnormality on the power line 32 connected to the power consumer 310, when power exchange with the power consumer 310 is impossible. In addition, the abnormality acquiring unit 210 may acquire an abnormality on power line 32 by monitoring impedance of the power line 32 connected to the power consumer 310.

The abnormality acquiring unit 210 may be informed of an abnormality on the power line 32 from the power consumer 310 or the power consumer 320. For example, the abnormality acquiring unit 210 receives, via a communication network 20, information indicating that an abnormality has occurred on the power line 32 built between the power consumer 310 and the power consumer 320, from a terminal 400 which the power consumer 310 has or a terminal 420 which the power consumer 320 has. The terminal 400 and the terminal 420 may be any communication terminals having a communication function.

The communication network 20 may include at least any of the Internet, a cellular network, and dedicated networks such as a LAN (Local Area Network) in the CEMS 30. Communications between the server 200, the terminal 400 which the power consumer 310 has, the terminal 420 which the power consumer 320 has, and the communication network 20 may be wired communications or wireless communications.

For example, when electric power cannot be supplied to the power consumer 320 via the power line 32, when electric power cannot be received from the power consumer 320 via the power line 32, and so on, the terminal 400 transmits, to the server 200 via the communication network 20, information indicating that an abnormality has occurred on the power line 32 built between the power consumer 310 and the power consumer 320.

For example, when electric power cannot be supplied to the power consumer 310 via the power line 32, when electric power cannot be received from the power consumer 310 via the power line 32, and so on, the terminal 420 transmit, to the server 200 via the communication network 20, information indicating that an abnormality has occurred on the power line 32 built between the power consumer 310 and the power consumer 320.

The unmanned aircraft 110 transports the MB 130, when the abnormality acquiring unit 210 acquires an abnormality on the power line 32. For example, when the abnormality acquiring unit 210 acquires an abnormality on the power line 32 used for power exchange between the power consumer 310 and the power consumer 320, the unmanned aircraft 110 transports the MB 130 placed on the placement unit 313 to the placement unit 323.

For example, in a disconnected condition where the CEMS 30 is not connected with the utility grid 10, when the power line 32 between the power consumer 310 and the power consumer 320 is disconnected, the power consumer 320 can receive electric power neither from the utility grid 10 via the power grid 31 nor from the power consumer 310. Even in such a case, according to the power system 100 in accordance with this embodiment, the unmanned aircraft 110 transports the MB 130 from the placement unit 313 to the placement unit 323, so that electric power can be supplied to the power consumer 320. By transporting the MB 130 to the placement unit 323, for example, even when the remaining amount of electric power stored in the FB 322 is lost, electric power can be supplied to the power consuming device 321. In addition, by transporting the MB 130 to the placement unit 323, a maximum storage capacity in the power consumer 320 can be expanded.

The unmanned aircraft 110 may communicate with the server 200. The unmanned aircraft 110 and the server 200 communicate with each other, for example, via the communication network 20. The server 200 may perform a power exchange method including: acquiring an abnormality on the power line 32 between the power consumer 310 and power consumer 320; upon acquiring the abnormality, causing the unmanned aircraft 110 to remove the MB 130 from the placement unit 313; and causing the unmanned aircraft 110 to place the MB 130 on the placement unit 323. For example, when acquiring an abnormality on the power line 32 between the power consumer 310 and the power consumer 320, the server 200 transmits, to the unmanned aircraft 110, a command to remove the MB 130 from the placement unit 313, and transmits, to the unmanned aircraft 110, a command to place the MB 130 on the placement unit 323 after the MB 130 is removed from the placement unit 313 by the unmanned aircraft 110. In addition, when acquiring an abnormality on the power line 32 between the power consumer 310 and the power consumer 320, the server 200 may transmit, to the unmanned aircraft 110, a command to remove the MB 130 from the placement unit 313 and place the MB 130 on the placement unit 323. For example, when the abnormality acquiring unit 210 acquires an abnormality on the power line 32, the server 200 may cause the unmanned aircraft 110 to transport the MB 130, by transmitting information indicating a transport source of the MB 130 and information indicating a transport destination of the MB 130 to the unmanned aircraft 110. The server 200 may have a mobile object controlling unit (not shown) for controlling the unmanned aircraft 110 to cause the unmanned aircraft 110 to remove the MB 130 from the placement unit 313 and place the MB 130 on the placement unit 323 when the abnormality acquiring unit 210 acquires an abnormality on the power line 32 between the power consumer 310 and the power consumer 320.

The information indicating the transport source of the MB 130 may be any information as long as it can identify the location where the MB 130 is placed. For example, the information indicating the transport source of the MB 130 is information indicating the location where the MB 130 is placed. Further, for example, the information indicating the transport source of the MB 130 is information identifying a placement unit where the MB 130 is placed. The unmanned aircraft 110 may associate the information identifying the placement unit with the information indicating the location of the placement unit and store them. In addition, for example, the information indicating the transport source of the MB 130 is information identifying a power consumer where the MB 130 is placed. The unmanned aircraft 110 may associate the information identifying the power consumer with information indicating the location of the power consumer and store them.

The information indicating the transport destination of the MB 130 may be any information as long as it can identify a location where the MB 130 is to be placed. For example, the information indicating the transport destination of the MB 130 is information identifying a placement unit where the MB 130 is to be placed, information identifying a power consumer where the MB 130 is to be placed, and the like.

The unmanned aircraft 110 may move to a location where the MB 130 is placed according to the information received from the server 200 indicating the transport source of the MB 130, hold the MB 130, and move the MB 130 according to the information indicating the transport destination of the MB 130. When the information indicating the transport source indicates the placement unit 313 and the information indicating the transport destination indicates the placement unit 323, the unmanned aircraft 110 moves to the placement unit 313 and holds the MB 130, and then moves to the placement unit 323 and places the NM 130 on the placement unit 323.

The unmanned aircraft 110 may have a monitoring unit for monitoring a location where the MB 130 is placed. In this case, the server 200 may transmit information indicating the transport destination of the MB 130 to the unmanned aircraft 110, without transmitting information indicating the transport source of the MB 130. When receiving the information indicating the transport destination of the MB 130, the unmanned aircraft 110 may move to a location where the MB 130 monitored by the monitoring unit is placed, hold the MB 130, and then move the MB 130 according to the information indicating the transport destination of the MB 130. The monitoring unit monitors the MB 130, for example, by analyzing an image captured by an imaging unit which the unmanned aircraft 110 has. In addition, for example, when the server 200 knows the location of the MB 130, the monitoring unit may monitor the location of the MB 130 by periodically receiving the location of the MB 130 from the server 200, and so on.

The unmanned aircraft 110 may also stand by on the MB 130. Even in this case, the server 200 may transmit information indicating the transport destination of the MB 130 to the unmanned aircraft 110, without transmitting information indicating the transport source of the MB 130. When receiving information indicating the transport destination of the MB 130, the unmanned aircraft 110 may load the MB 130 thereon, on which the unmanned aircraft 110 has stood by, and move the MB 130 according to the information indicating the transport destination of the MB 130.

In this way, the unmanned aircraft 110 may stand by on the MB 130. In addition, the unmanned aircraft 110 may also stand by near the placement unit 313 or near the placement unit 323. In addition, the unmanned aircraft 110 may also stand by above the station 140. The station 140 may have a placement unit where unmanned aircraft 110 is placed. The station 140 may enable to supply electric power to the unmanned aircraft 110 placed. The number of unmanned aircrafts 110 in the CEMS 30 may be one or more.

In FIG. 1, the example in which the server 200 has the abnormality acquiring unit 210 has been described, but not limited thereto, and the terminal 400 may also have the abnormality acquiring unit 210. For example, in a disconnected condition where the CEMS 30 is not connected with the utility grid 10, when the abnormality acquiring unit 210 acquires an abnormality on the power line 32, the terminal 400 may transmit, to the unmanned aircraft 110 via the communication network 20, information indicating the placement unit 313 as a transport source and indicating the placement unit 323 as a transport destination. In addition, the terminal 400 may transmit, to the unmanned aircraft 110 via the communication network 20, information indicating the placement unit 323 as a transport source and indicating the placement unit 313 as a transport destination, for example.

In this way, the terminal 400 may perform a power exchange method including: acquiring an abnormality on the power line 32 between the power consumer 310 and power consumer 320; if an abnormality is acquired when the MB 130 is placed on the placement unit 313, causing the unmanned aircraft 110 to remove the MB 130 from the placement unit 313 of the power consumer 310; and causing the unmanned aircraft 110 to place the MB 130 on the placement unit 323 of the power consumer 320. The terminal 400 may have: the abnormality acquiring unit 210; and a mobile object controlling unit (not shown) for controlling the unmanned aircraft 110 to remove the MB 130 from the placement unit 313 and place the MB 130 on the placement unit 323, when the abnormality acquiring unit 210 acquires an abnormality on the power line 32 between the power consumer 310 and the power consumer 320.

In FIG. 1, while the example of transporting the MB 130 in a disconnected condition where the CEMS 30 is not connected with the utility grid 10 is illustrated as an example, the MB 130 may be transported in a connected condition where the CEMS 30 is connected with the utility grid 10.

Furthermore, in FIG. 1, the example that the CEMS 30 is connected to the utility grid 10 has been described, but not limited thereto, and the CEMS 30 may not be connected to the utility grid 10. That is, the CEMS 30 may also be so-called off-grid CEMS.

In FIG. 1, the example targeted to electric power has been described, but not limited thereto, and energy or energy sources other than electric power may be targeted. That is, an energy system may be provided, including: an abnormality acquiring unit for acquiring an abnormality on energy paths used for energy exchange, which are built between a plurality of energy consumers in a community; and a mobile object for autonomously moving with a mobile energy storage device loaded thereon, which is capable of storing energy or energy sources, between the plurality of energy consumers, when the abnormality acquiring unit acquires an abnormality.

Examples of energy or energy sources other than electric power include hydrogen for fuel cells, biofuels for combustion power generators, and the like. When hydrogen is targeted, an energy path may be a hydrogen pipeline, and a mobile energy storage device may be a mobile hydrogen tank. When a biofuel is targeted, an energy path may be a biofuel pipeline, and a mobile energy storage device may be a mobile biofuel tank.

For example, the server 200 may perform an energy exchange method including: acquiring an abnormality on an energy path between a first energy consumer having a first energy consuming device (such as a consumer electronics device) and a first placement unit for removably placing a mobile energy storage device, and a second energy consumer having a second energy consuming device and a second placement unit for removably placing the mobile energy storage device; causing an unmanned aircraft 110 to remove the mobile energy storage device from the first placement unit, if an abnormality is acquired when the mobile energy storage device is placed on the first placement unit; and causing the unmanned aircraft 110 to place the mobile energy storage device on the second placement unit.

Furthermore, for example, an energy exchange method may be performed, including: acquiring, by the first energy consumer, an abnormality on the energy path between the first energy consumer and the second energy consumer; causing the unmanned aircraft 110 to remove the mobile energy storage device from the placement unit of the first energy consumer, if an abnormality is acquired when the mobile energy storage device is placed on the placement unit of the first energy consumer; and causing the unmanned aircraft 110 to place the mobile energy storage device on the placement unit of the second energy consumer. By causing the unmanned aircraft 110 to transport the mobile energy storage device between the energy consumers when the abnormality acquiring unit acquires an abnormality on the energy path, even when an abnormality occurs on the energy path, energy exchange can be performed between the energy consumers.

Figure 2:
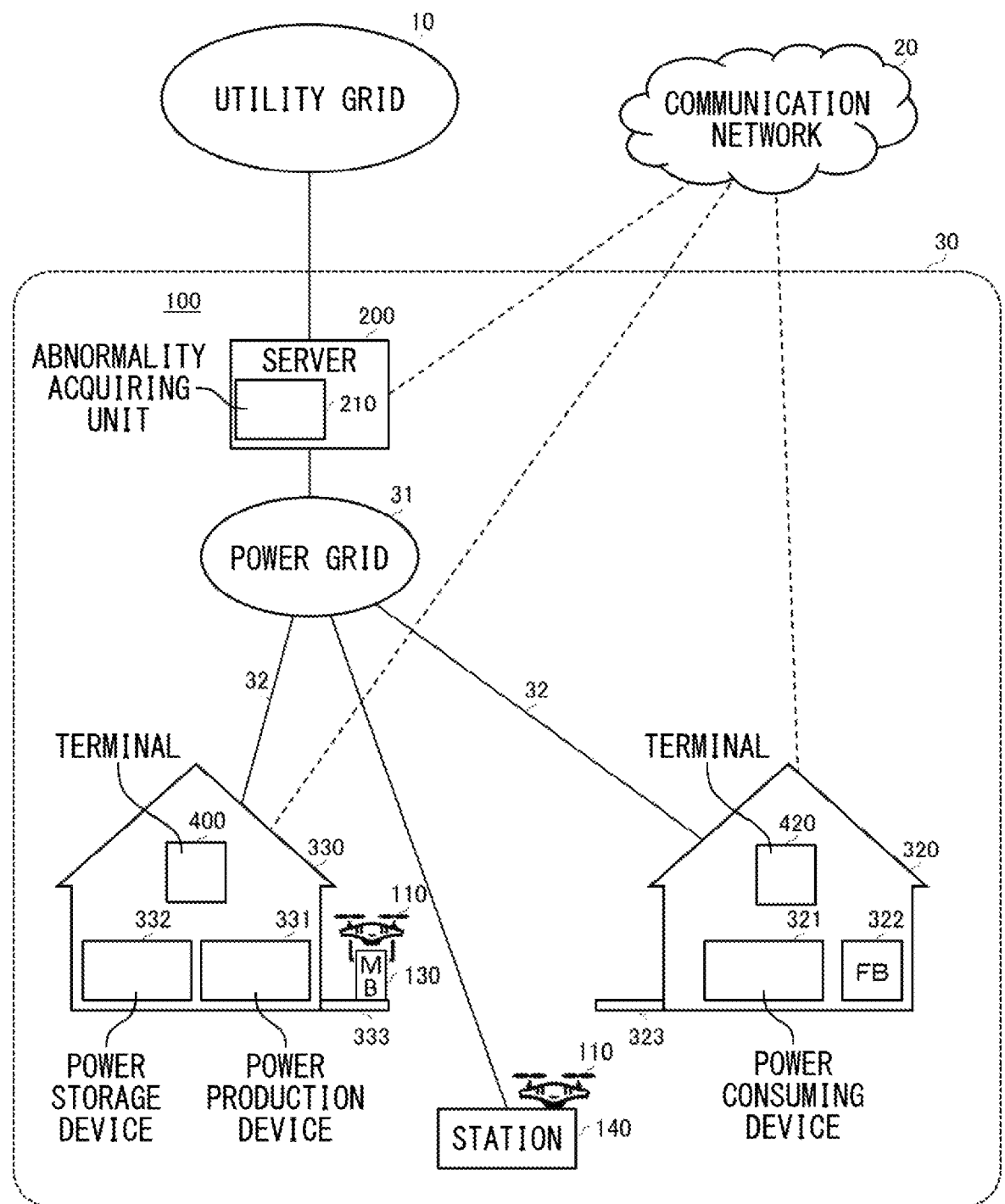
FIG. 2 schematically illustrates another example of the power system 100.

FIG. 2 schematically illustrates another example of the power system 100. Here, different points from FIG. 1 are mainly described. In the example shown in FIG. 2, a CEMS 30 includes a power grid 31, a power supplier 330, a power consumer 320, a server 200, a station 140, and an unmanned aircraft 110.

The power supplier 330 may have a power production device 331 for producing electric power and a power storage device 332 for storing electric power. The power production device 331 may be any device as long as it can produce electric power. For example, the power production device 331 is a solar power generation device.

The power supplier 330 may supply electric power produced by the power production device 331 to outside. The power supplier 330 supplies electric power produced by the power production device 331 to outside via the power grid 31, for example. In addition, the power supplier 330 supplies electric power produced by the power production device 331 to outside via an MB 130, for example.

Furthermore, the power supplier 330 may supply electric power stored in the power storage device 332 to outside. The power supplier 330 supplies electric power stored in the power storage device 332 to outside via the power grid 31, for example. In addition, the power supplier 330 supplies electric power stored in the power storage device 332 to outside via the MB 130, for example.

The power storage device 332 may store electric power supplied from the utility grid 10 via the power grid 31. In addition, the power storage device 332 may store electric power produced by the power production device 331.

The power supplier 330 may have only any one of the power production device 331 and the power storage device 332. The power supplier 330 may be a general household in the CEMS 30, or may be a power-supply facility supplying electric power to power consumers in the CEMS 30.

The power supplier 330 has a placement unit 333. The power supplier 330 may store electric power produced by the power production device 331 in the MB 130 placed on the placement unit 333. The power supplier 330 may store electric power stored in the power storage device 332 in the MB 130 placed on the placement unit 333.

The terminal 400 that the power supplier 330 has may perform a power exchange method including: acquiring an abnormality on the power line 32 between the power supplier 330 and the power consumer 320; causing the unmanned aircraft 110 to remove the MB 130 from the placement unit 333, if an abnormality is acquired when the MB 130 is placed on the placement unit 333; and causing the unmanned aircraft 110 to place the MB 130 on the placement unit 323.

The server 200 may perform a power exchange method including: acquiring an abnormality on the power line 32 between the power supplier 330 and the power consumer 320; causing the unmanned aircraft 110 to remove the MB 130 from the placement unit 313, when an abnormality is acquired; causing the unmanned aircraft 110 to place the MB 130 on the placement unit 323.

Figure 3:
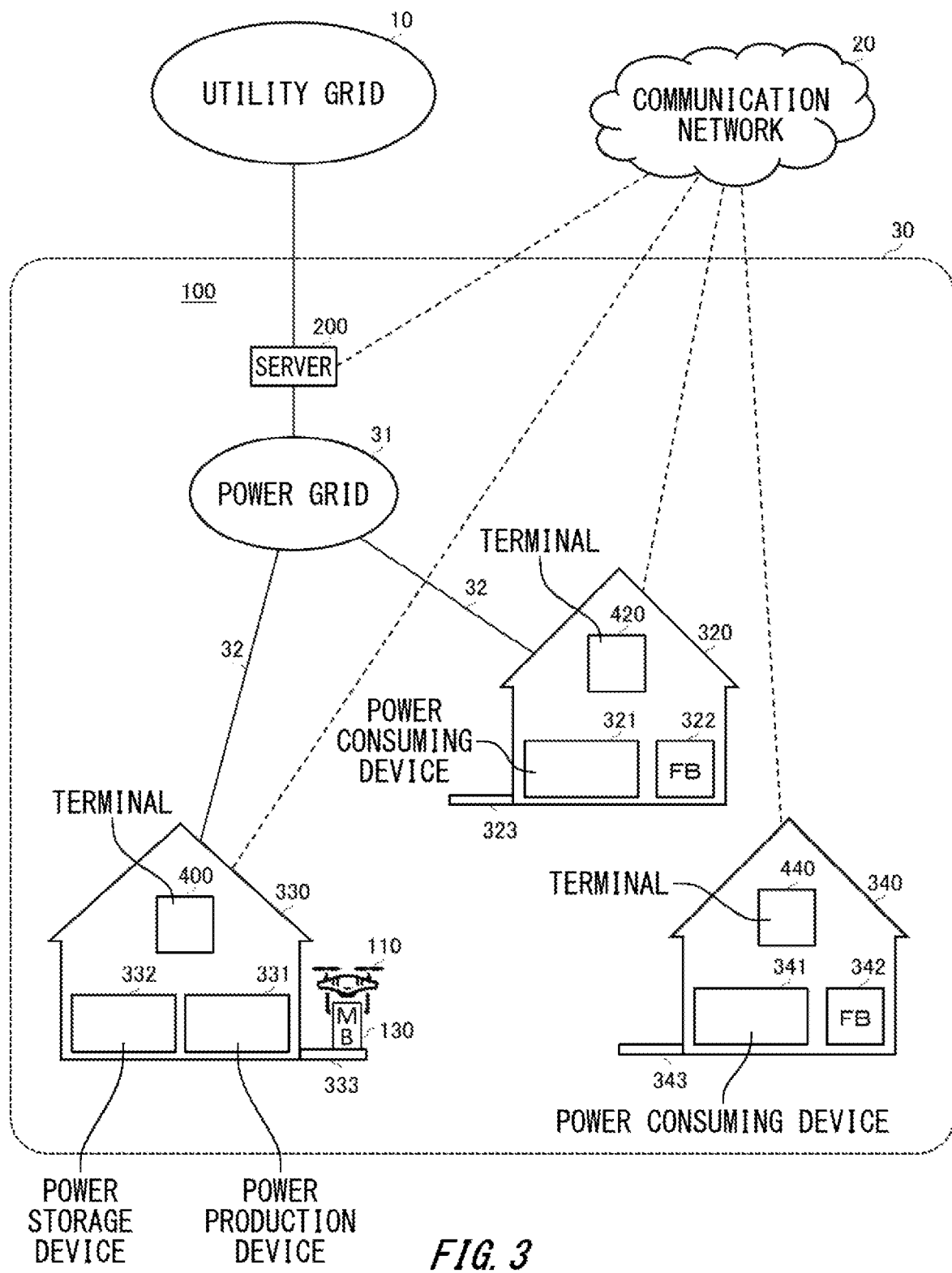
FIG. 3 schematically illustrates another example of the power system 100.

FIG. 3 schematically illustrates another example of the power system 100. Here, different points from FIG. 2 are mainly described. In the example shown in FIG. 3, a CEMS 30 includes a power consumer 340 in addition to a power supplier 330 and a power consumer 320. The power consumer 340 is not connected with a power grid 31.

In the example shown in FIG. 3, the power supplier 330 supplies electric power, via a MB 130, to any one of the power consumer 320 and the power consumer 340. For example, a terminal 400 that power supplier 330 has acquires: exchange information 325 indicating a cost or a loss in a case that the power supplier 330 and the power consumer 320 exchange electric power; and exchange information 345 indicating a cost or a loss in a case that the power supplier 330 and the power consumer 340 exchange electric power. Then, the power supplier 330 determines a power receiver receiving electric power via the MB 130, based on the exchange information 325 and the exchange information 345. When determining the power consumer 340 as the power receiver, the power supplier 330 may control an unmanned aircraft 110 to remove the MB 130 from a placement unit 333 and place the MB 130 on the placement unit of the power receiver.

In this way, a terminal 400 the power supplier 330 has may perform a power exchange method including: acquiring the exchange information 325; acquiring the exchange information 345; determining the power consumer 340 as the power receiver receiving electric power via the MB 130, based on the exchange information 325 and the exchange information 345; causing the unmanned aircraft 110 to remove the MB 130 from the placement unit where the MB 130 is placed; and causing the unmanned aircraft 110 to place the MB 130 on the placement unit 343 of the power consumer 340.

In addition, the terminal 440 that the power consumer 340 has may perform a power exchange method including: providing the exchange information 345 to the terminal 400; and accepting, from the unmanned aircraft 110, the MB 130 removed from the placement unit 333 by the unmanned aircraft 110, in response to the power consumer 340 having been determined, by the terminal 400, as a target for receiving electric power via the MB 130 based on the exchange information 345.

The exchange information 325 may indicate a cost or a loss in a case that the power supplier 330 and the power consumer 320 exchange electric power via the MB 130. The exchange information 325 may include consideration-for-reception information in a case that the power consumer 320 receives electric power via the MB 130. The exchange information 325 may include an amount of power that the power consumer 320 desires. The exchange information 325 may include consideration-for-transfer information indicating consideration that the power supplier 330 receives when transferring electric power to the power consumer 320 via the MB 130.

The exchange information 325 may include an electrical loss in a case that electric power is transferred from the power supplier 330 to the power consumer 320 via the MB 130. For example, the electrical loss may be power consumption or the like of the MB 130, which is required for transporting the MB 130 from the power supplier 330 to the power consumer 320. The exchange information 325 may include a temporal loss in a case that electric power is transferred from the power supplier 330 to the power consumer 320 via the MB 130. For example, the temporal loss may be time or the like which is required for transporting the MB 130 from the power supplier 330 to the power consumer 320. The exchange information 325 may include a mechanical loss in a case that electric power is transferred from the power supplier 330 to the power consumer 320 via the MB 130. For example, the mechanical loss may be degradation or the like of the MB 130 in a case that MB 130 is transported from the power supplier 330 to the power consumer 320.

The exchange information 345 may indicate a cost or a loss in a case that the power supplier 330 and the power consumer 340 exchange electric power via the MB 130. The exchange information 345 may include consideration-for-reception information in a case that the power consumer 340 receives electric power via the MB 130. The exchange information 345 may include an amount of power that the power consumer 340 desires. The exchange information 325 may include consideration-for-transfer information indicating consideration that the power supplier 330 receives when transferring electric power to the power consumer 340 via the MB 130.

The exchange information 345 may include an electrical loss in a case that electric power is transferred from the power supplier 330 to the power consumer 340 via the MB 130. The exchange information 325 may include a temporal loss in a case that electric power is transferred from the power supplier 330 to the power consumer 340 via the MB 130. The exchange information 325 may include a mechanical loss in a case that electric power is transferred from the power supplier 330 to the power consumer 340 via the MB 130.

For example, the terminal 400 compares the consideration-for-reception information included in the exchange information 325 with the consideration-for-reception information included in the exchange information 345, and selects, as a power receiver, either one having higher monetary benefit than the power supplier 330, of the power consumer 320 or the power consumer 340. In this way, each of the exchange information 325 and the exchange information 345 include the consideration-for-reception information, so that power exchange that a power consumer side satisfies can be concluded.

In addition, for example, the terminal 400 compares the consideration-for-transfer information included in the exchange information 325 with the consideration-for-transfer information included in the exchange information 345, and selects, as a power receiver, either one having higher monetary benefit than the power supplier 330, of the power consumer 320 or the power consumer 340. In this way, each of the exchange information 325 and the exchange information 345 include the consideration-for-transfer information, so that power exchange that a power supplier 330 side satisfies can be concluded.

Furthermore, for example, the terminal 400 compares the electrical loss included in the exchange information 325 with the electrical loss included in the exchange information 345, and selects, as a power receiver, either one having less electrical loss, of the power consumer 320 and the power consumer 340. Furthermore, for example, the terminal 400 compares the temporal loss included in the exchange information 325 with the temporal loss included in the exchange information 345, and selects, as a power receiver, either one having less temporal loss, of the power consumer 320 and the power consumer 340. Furthermore, for example, the terminal 400 compares the mechanical loss included in the exchange information 325 with the mechanical loss included in the exchange information 345, and selects, as a power receiver, either one having less mechanical loss, of the power consumer 320 and the power consumer 340. The terminal 400 may select, as a power receiver, any of the power consumer 320 and the power consumer 340, considering two or more of the consideration-for-reception information, the consideration-for-transfer information, the electrical loss, temporal loss, and the mechanical loss included in the exchange information 325.

The exchange information 325 may indicate a cost or a loss in a case that the power supplier 330 and the power consumer 320 exchange electric power via the power grid 31. The exchange information 325 may include consideration-for-reception information in a case that the power consumer 320 receives electric power via the power grid 31. The exchange information 325 may include an amount of power that the power consumer 320 desires. The exchange information 325 may include consideration-for-transfer information indicating consideration that the power supplier 330 receives when transferring electric power to the power consumer 320 via the power grid 31.

The exchange information 325 may include an electrical loss in a case that electric power is transferred from the power supplier 330 to the power consumer 320 via the power grid 31. For example, the electrical loss may be a transmission loss or the like in a case that electric power is transmitted from the power supplier 330 to the power consumer 320 via the power grid 31. The exchange information 325 may include a temporal loss in a case that electric power is transferred from the power supplier 330 to the power consumer 320 via the power grid 31. For example, the temporal loss may be time or the like which is required for transmitting electric power from the power supplier 330 to the power consumer 320 via the power grid 31. The exchange information 325 may include a mechanical loss in a case that electric power is transferred from the power supplier 330 to the power consumer 320 via the power grid 31.

For example, when the power line 32 between the power supplier 330 and the power consumer 340 is disconnected, when an imperfection occurs on the power line 32, and the like, that the power supplier 330 transfers electric power to the power consumer 340 via the MB 130 may be more advantageous for the power supplier 330 than that the power supplier 330 transfers electric power to the power consumer 320 via the power grid 31. In such a case, an advantageous result for the power supplier 330 can be acquired by controlling to transfer electric power to the power consumer 340 via the MB 130. Note that when a consideration indicated by consideration-for-reception information included in the exchange information 345 is higher than a consideration indicated by consideration-for-reception information included in the exchange information 325, when a desired amount of power included in the exchange information 345 is larger than a desired amount of power included in the exchange information 325, or the like, that the power supplier 330 transfers electric power to the power consumer 340 via the MB 130 may be more advantageous for the power supplier 330 than that the power supplier 330 transfers electric power to the power consumer 320 via the power grid 31.

In the example shown in FIG. 3, a server 200 communicably connected with the power supplier 330, the power consumer 320 and the power supplier 330 may control the unmanned aircraft 110 to remove the NIB 130 from the placement unit 333 and place it on the placement unit 323 or the placement unit 343.

For example, the server 200 receives the exchange information 325 from the power consumer 320, receives the exchange information 345 from the power consumer 340, determines a power receiver that receives electric power via the MB 130, based on the exchange information 325 and the exchange information 345, and when the power consumer 340 is determined as the power receiver, cause the unmanned aircraft 110 to remove the MB 130 placed on the placement unit 333 from the placement unit 333 and to place it on the placement unit of the determined power receiver. An approach for determining the power receiver based on the exchange information 325 and the exchange information 345 may be similar to the approach using the terminal 400 described above.

In this way, the server 200 may perform a power exchange method including: acquiring the exchange information 325 and the exchange information 345; determining a power receiver that receives electric power via the MB 130, based on the exchange information 325 and the exchange information 345; causing the unmanned aircraft 110 to remove the MB 130 from the placement unit 333, when power consumer 340 is determined as the power receiver; and causing the unmanned aircraft 110 to place the MB 130 on the placement unit of the power receiver.

Just like the example described in FIG. 1, the example described in FIG. 3 may also deal with energy or energy sources other than electric power as a target. That is, the power supplier 330 may be at least any of an energy generation device for generating energy or energy sources and an energy storage device for storing energy or energy sources, and an energy supplier having a placement unit for removably placing a mobile energy storage device capable of storing energy or energy sources; the power consumer 320 may be a first energy consumer having a placement unit for removably placing the mobile energy storage device and an energy consuming device for consuming energy; the power consumer 340 may be a second energy consumer having a placement unit for removably placing the mobile energy storage device and an energy consuming device; the power grid 31 may be an energy path; and the MB 130 may be the mobile energy storage device.

The server 200 may perform an energy exchange method including: acquiring first exchange information including information about a cost or a loss in a case that an energy supplier and a first energy consumer exchange energy, and second exchange information including information about a cost or a loss in a case that the energy supplier and a second energy consumer exchange electric power; determining the first energy consumer or the second energy consumer as an energy receiver that receives energy or energy sources via the mobile energy storage device, based on the first exchange information and the second exchange information; and when the energy receiver is determined, causing the unmanned aircraft 110 to remove the mobile energy storage device from a placement unit of the energy supplier and place the mobile energy storage device on a placement unit of the energy receiver.

Furthermore, the energy supplier may perform an energy exchange method including: acquiring, from a first energy consumer, first exchange information including information about a cost or a loss in a case that the first energy consumer exchanges energy or energy sources; acquiring, from a second energy consumer, second exchange information including information about a cost or a loss in a case that the second energy consumer exchange energy or energy sources; selecting the first energy consumer or the second energy consumer as a target that receives energy or energy sources via a mobile energy storage device, based on the first exchange information and the second exchange information; causing a unmanned aircraft 110 to remove the mobile energy storage device from a placement unit where the mobile energy storage device is placed; and causing the unmanned aircraft 110 to place the mobile energy storage device on a placement unit of the selected first energy consumer or the selected second energy consumer.

Furthermore, the second energy consumer may perform an energy exchange method including: providing first exchange information to an energy supplier or a server 200; and accepting, from an unmanned aircraft 110, a mobile energy storage device removed from a placement unit of an energy supplier by the unmanned aircraft 110, in response to the second energy consumer having been selected as a target that receives energy or energy sources via the mobile energy storage device based on the first exchange information.

The first exchange information may include consideration-for-reception information in a case that first energy consumer receives energy or energy sources via the mobile energy storage device. The first exchange information may include an amount of energy or energy sources that the first energy consumer desires. The first exchange information may include consideration-for-transfer information indicating a consideration that the energy supplier receives when transferring energy or energy sources to the first energy consumer via the mobile energy storage device. The first exchange information may include a temporal loss in a case that energy or energy sources are transferred from the energy supplier to the first energy consumer via the mobile energy storage device. The first exchange information may include a mechanical loss in a case that energy or energy sources are transferred from the energy supplier to the first energy consumer via the mobile energy storage device.

The second exchange information may include consideration-for-reception information in a case that the second energy consumer receives energy or energy sources via the mobile energy storage device. The second exchange information may include an amount of energy or energy sources that the second energy consumer desires. The second exchange information may include consideration-for-transfer information indicating a consideration that the energy supplier receives when transferring energy or energy sources to the second energy consumer via the mobile energy storage device. The second exchange information may include a temporal loss in a case that energy or energy sources are transferred from the energy supplier to the second energy consumer via the mobile energy storage device. The second exchange information may include a mechanical loss in a case that energy or energy sources are transferred from the energy supplier to the first energy consumer via the mobile energy storage device.

Figure 4:
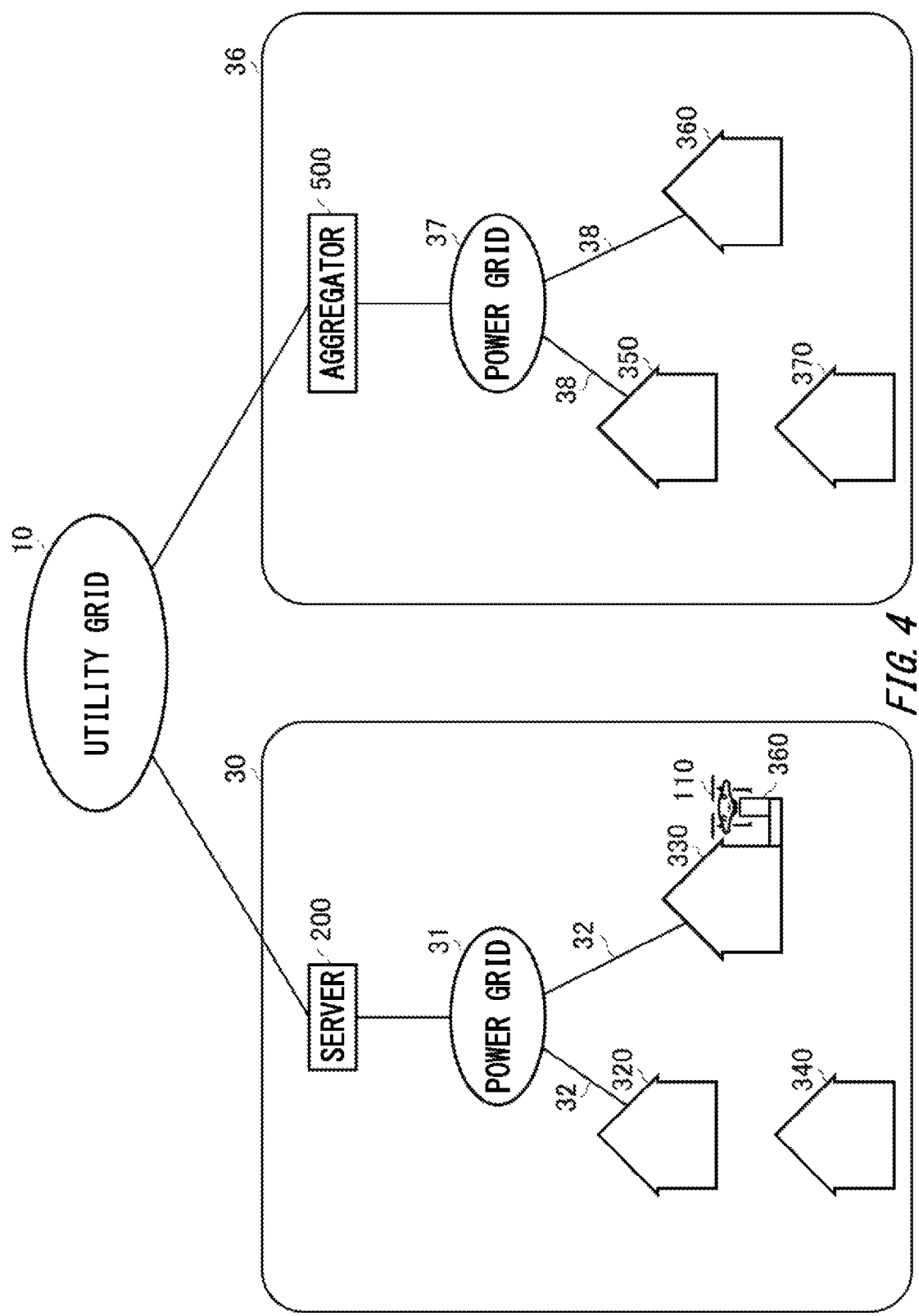
FIG. 4 schematically illustrates another example of the power system 100.

FIG. 4 schematically illustrates another example of the power system 100. Here, different points from FIG. 3 are mainly described. In the example shown in FIG. 4, an unmanned aircraft 110 also perform transportation to a power consumer 370 in the CEMS 36 different from a CEMS 30.

The CEMS 36 includes an aggregator 500, a power grid 37, a power supplier 360, power consumer 350 and a power consumer 370. The power supplier 360 and the power consumer 350 are connected to the power grid 37, and the power consumer 370 is not connected to the power grid 37.

For example, a server 200: receives, from a power consumer 340 via a communication network 20 (not shown), exchange information in a case that electric power is exchanged from a power supplier 330 to the power consumer 340 via an MB 130; receives, from the power consumer 370 via the communication network 20 (not shown), exchange information in a case that electric power is exchanged from the power supplier 330 to the power consumer 370 via the MB 130; selects the power consumer 340 or the power consumer 370 as a power receiver based on the received exchange information; causing an unmanned aircraft 110 to remove the MB 130 from a placement unit of the power supplier 330 and place it on a placement unit of the power consumer 370, when the power consumer 370 is selected as the power receiver.

Furthermore, for example, the power supplier 330: receives, from the power consumer 340 via the communication network 20 (not shown), exchange information in a case that electric power is exchanged from the power supplier 330 to the power consumer 340 via the MB 130; receives, from the power consumer 370 via the communication network 20 (not shown), exchange information in a case that electric power is exchanged from the power supplier 330 to the power consumer 370 via the MB 130; selects the power consumer 340 or the power consumer 370 as a power receiver based on the received exchange information; and cause the unmanned aircraft 110 to remove the MB 130 from a placement unit of the power supplier 330 and place it on a placement unit of the power consumer 370, when the power consumer 370 is selected as the power receiver.

Figure 5:
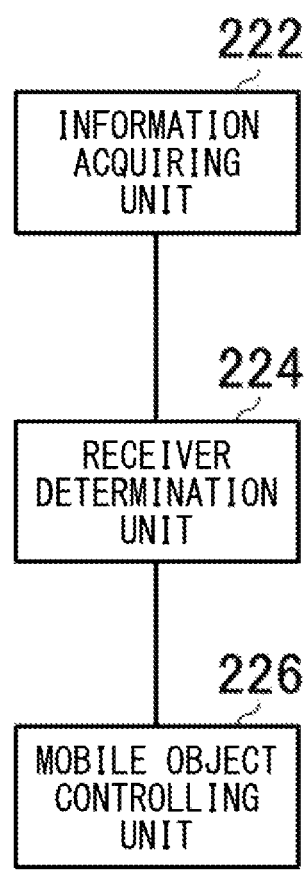
FIG. 5 schematically illustrates an example of a functional configuration in a server 200.

FIG. 5 schematically illustrates an example of a functional configuration in a server 200. The server 200 illustrated in FIG. 5 includes an information acquiring unit 222, a receiver determination unit 224, and a mobile object controlling unit 226.

The information acquiring unit 222 acquires the exchange information 325. The information acquiring unit 222 may receive the exchange information 325 from the power consumer 320. In addition, the information acquiring unit 222 may also receive the exchange information 325 from the power supplier 330.

In addition, the information acquiring unit 222 acquires the exchange information 345. The information acquiring unit 222 may receive the exchange information 345 from the power consumer 340. The information acquiring unit 222 may also receive the exchange information 345 from the power supplier 330.

The information acquiring unit 222 may acquire exchange information including information about a cost or a loss in a case that electric power is exchanged between the power supplier 330 and the power consumer 370. The information acquiring unit 222 receives, for example, the exchange information from the power consumer 370.

The receiver determination unit 224 determines a power receiver that receives electric power via the MB 130, based on the exchange information that the information acquiring unit 222 has acquired. The receiver determination unit 224 determines the power consumer 320 or the power consumer 340 as a power receiver, based on the exchange information 325 and the exchange information 345, for example.

The mobile object controlling unit 226 controls the unmanned aircraft 110. The mobile object controlling unit 226 may control the unmanned aircraft 110 to cause the unmanned aircraft 110 to transport the MB 130. For example, the mobile object controlling unit 226 causes the unmanned aircraft 110 to remove the MB 130 from the placement unit 333 and place the MB 130 on the placement unit 343, when the receiver determination unit 224 determines the power consumer 340 as the power receiver.

In FIG. 5, the example targeted to electric power has been described, but the server 200 may target energy or energy sources other than electric power.

Figure 6:
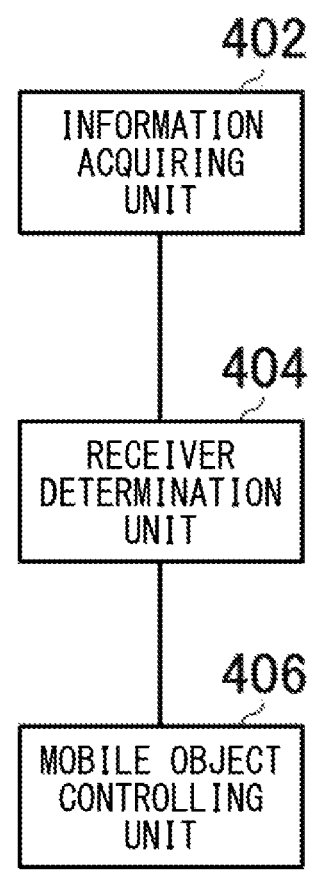
FIG. 6 schematically illustrates an example of a functional configuration in a terminal 400.

FIG. 6 schematically illustrates an example of a functional configuration in a terminal 400. The terminal 400 illustrated in FIG. 6 includes an exchange information acquiring unit 402, a receiver determination unit 404, and a mobile object controlling unit 406.

The exchange information acquiring unit 402 acquires exchange information. The exchange information acquiring unit 402 may acquire the exchange information 325. For example, the exchange information acquiring unit 402 receives the exchange information 325 from the power consumer 320. The exchange information acquiring unit 402 may acquire the exchange information 345. For example, the exchange information acquiring unit 402 receives the exchange information 345 from the power consumer 340. The exchange information acquiring unit 402 may acquire exchange information including information about a cost or a loss in a case that electric power is exchanged between the power supplier 330 and the power consumer 370. For example, the exchange information acquiring unit 402 receives the exchange information from the power consumer 370.

The receiver determination unit 404 determines a power receiver that receives electric power via the MB 130, based on the exchange information that the information acquiring unit 222 has acquired. The receiver determination unit 404 determines the power consumer 320 or the power consumer 340 as a power receiver, based on the exchange information 325 and the exchange information 345, for example.

The mobile object controlling unit 406 controls the unmanned aircraft 110. The mobile object controlling unit 406 may control the unmanned aircraft 110 to cause the unmanned aircraft 110 to transport the MB 130. For example, the mobile object controlling unit 406 causes the unmanned aircraft 110 to remove the MB 130 from the placement unit 333 and place the MB 130 on the placement unit 343, when the receiver determination unit 224 determines the power consumer 340 as the power receiver.

In FIG. 6, the example targeted to electric power has been described, but the terminal 400 may target energy or energy sources other than electric power.

Figure 7:
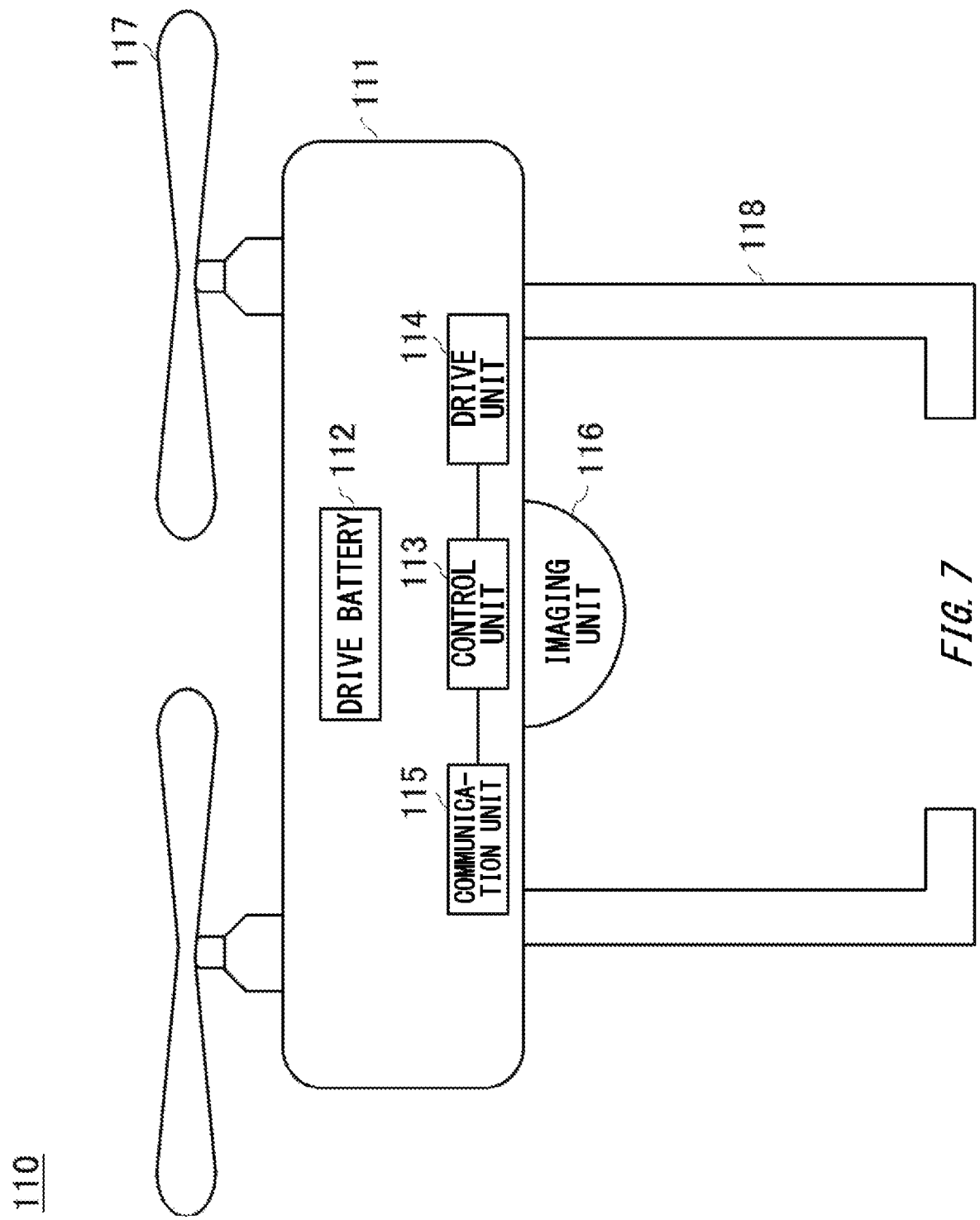
FIG. 7 schematically illustrates an example of a functional configuration in an unmanned aircraft 110.

FIG. 7 schematically illustrates an example of a functional configuration in the unmanned aircraft 110. The unmanned aircraft 110 illustrated in FIG. 7 includes a body 111, a drive battery 112, a control unit 113, a drive unit 114, a communication unit 115, an imaging unit 116, propellers 117, and holding arms 118.

The control unit 113 controls respective units. The drive unit 114 drives propellers 117 under the control of the control unit 113. The communication unit 115 perform communications via the communication network 20 or the like. The imaging unit 116 captures images around the unmanned aircraft 110. The holding arms 118 hold the MB 130.

When the holding arms 118 hold the MB 130, the drive battery 112 and the MB 130 may be electrically connected. The unmanned aircraft 110 may charge the drive battery 112 with electric power of the MB 130, while the holding arms 118 is holding the MB 130. In addition, the unmanned aircraft 110 may charge the MB 130 with electric power of the drive battery 112, while holding arms 118 are holding the MB 130.

For example, when the power consumer 320 is determined as a power receiver by the server 200 or the terminal 400 based on the exchange information 325 and the exchange information 345, the unmanned aircraft 110 removes the MB 130 from the placement unit 333 and place it on the placement unit 323. When the power consumer 320 is determined as the power receiver, the unmanned aircraft 110 may remove the MB 130 from the placement unit 333 and place it on the placement unit 323 according to information transmitted by the server 200 or the terminal 400.

In the above embodiment, the mobile object has been described taking the unmanned aircraft 110 as an example, but not limited thereto. The mobile object may be anything other than the unmanned aircraft 110 as long as it can autonomously move with the MB 130 loaded thereon. For example, as an example of a mobile object, an automated drive vehicle such as an automated ATV (All Terrain Vehicle) may also be used. That the mobile object loads the MB 130 thereon includes any form in which the mobile object enables the MB 130 to be transported. For example, that the mobile object loads the MB 130 thereon includes that the mobile object holds the MB 130. Furthermore, for example, that the mobile object loads the MB 130 thereon includes that the mobile object loads the MB 130 onto the mobile object. As a specific example, that the mobile object loads the MB 130 thereon includes the mobile object loads the MB 130 onto a top board, when the mobile object has the top board.

In the above embodiment, the mobile power storage device has been described taking the MB 130 as an example, but not limited thereto. The mobile power storage device may be a battery that is loaded onto the mobile object and moves along with the mobile object. For example, when the mobile object is a vehicle, the mobile power storage device may be a battery that is loaded on the vehicle and move along with the vehicle. As a specific example, when the mobile object is an automated drive vehicle, the mobile power storage device may be a battery for driving the automated drive vehicle, which is always loaded on the automated drive vehicle.

Figure 8:
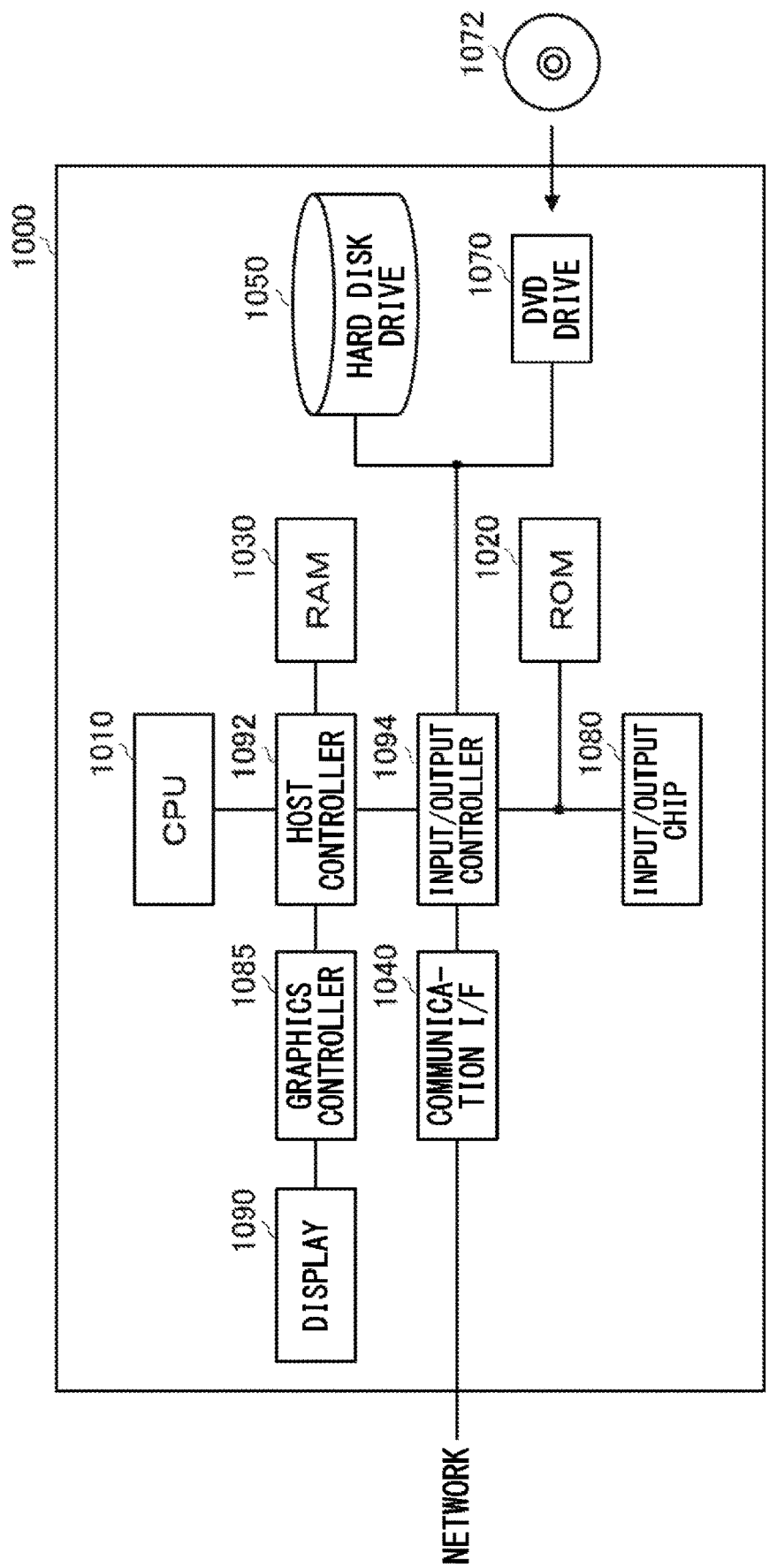
FIG. 8 schematically illustrates an example of a hardware configuration in a computer 1000 for functioning as the server 200 or the terminal 400.

FIG. 8 schematically illustrates an example of a computer 1000 functioning as a server 200 or a terminal 400. The computer 1000 according to this embodiment includes: a CPU-peripheral portion having a CPU 1010, RAM 1030, and a graphics controller 1085, which are interconnected by a host controller 1092; and a input/output portion having a ROM 1020, a communication I/F 1040, a hard disk drive 1050, a DVD drive 1070, and an input/output chip 1080, which are connected to the host controller 1092 by an input/output controller 1094.

The CPU 1010 operates based on programs stored in the ROM 1020 and the RAM 1030, and performs control of respective units. The graphics controller 1085 acquires image data which is produced on a frame buffer provided in the RAM 1030 by the CPU 1010 and the like, and displays the image data on a display 1090. Instead, the graphics controller 1085 may include the frame buffer for storing the image data produced by the CPU 1010 and the like inside.

The communication I/F 1040 communicates with other devices via a network in wired or wireless manner. In addition, the communication I/F 1040 functions as hardware for performing communications. The hard disk drive 1050 stores programs and data used by the CPU 1010. The DVD drive 1070 reads programs or data from the DVD-ROM 1072, and provide the programs or data to the hard disk drive 1050 via the RAM 1030.

The ROM 1020 stores the boot program executed in starting up the computer 1000, hardware dependent programs of the computer 1000, and the like. The input/output chip 1080 connects various input/output devices to an input/output controller 1094, for example, via a parallel port, a serial port, a keyboard port, a mouse port, and the like.

A program provided to the hard disk drive 1050 via the RAM 1030 is stored in a recording medium such as a DVD-ROM 1072 or an IC card and provided by a user. The program is read from the recording medium, installed into the hard disk drive 1050 via the RAM 1030, and executed in the CPU 1010.

A program that is installed into the computer 1000 and makes the computer 1000 function as the server 200 may work on the CPU 1010 and the like to make the computer 1000 function as respective units of the server 200, respectively. Information processing written in these programs is read into the computer 1000, thereby functioning as an abnormality acquiring unit and a mobile object controlling unit, which are a specific means in which software and the above-described various hardware resources cooperate. In addition, the information processing written in these programs is read into the computer 1000, thereby functioning as the information acquiring unit 222, the receiver determination unit 224, and the mobile object controlling unit 226, which are a specific means in which software and the above-described various hardware resources cooperate. Then, with these specific means, by achieving computing or processing of information according to an intended use of the computer 1000 in this embodiment, the specific server 200 is constructed according to the intended use.

A program that is installed into the computer 1000 and makes the computer 1000 function as the terminal 400 may work on the CPU 1010 and the like to make the computer 1000 function as respective units of the terminal 400, respectively. Information processing written in these programs is read into the computer 1000, thereby functioning as an abnormality acquiring unit and a mobile object controlling unit, which are a specific means in which software and the above-described various hardware resources cooperate. In addition, the information processing written in these programs is read into the computer 1000, thereby functioning as the exchange information acquiring unit 402, the receiver determination unit 404, and the mobile object controlling unit 406, which are a specific means in which software and the above-described various hardware resources cooperate. Then, with these specific means, by achieving computing or processing of information according to an intended use of the computer 1000 in this embodiment, the specific terminal 400 is constructed according to the intended use.

While the present invention have been described using the embodiments, the technical scope of the invention is not limited to the scope described in the above embodiments. It is apparent to persons skilled in the art that various alterations or improvements can be added to the above-described embodiments. It is also apparent from the description of the claims that the embodiments added with such alterations or improvements can be included in the technical scope of the invention.

The operations, procedures, steps, and stages and the like of each process performed by an apparatus, system, program, and method shown in the claims, specification, or drawings can be implemented in any order as long as the order is not indicated by "prior to," "before," or the like and as long as the output from a previous process is not used in a later process. For the operation flow in the claims, specification, or drawings, even if it is conveniently described using phrases such as "first" or "next", that does not necessarily mean that the process must be performed in this order.

EXPLANATION OF REFERENCES

10: utility grid, 20: communication network, 31: power grid, 32: power line, 37: power grid, 100: power system, 110: unmanned aircraft, 111: body, 112: drive battery, 113: control unit, 114: drive unit, 115: communication unit, 116: imaging unit, 117: propeller, 118: holding arm, 130: MB, 140: station, 200: server, 222: information acquiring unit, 224: receiver determination unit, 226: mobile object controlling unit, 310: power consumer, 311: power consuming device, 312: FB, 313: placement unit, 320: power consumer, 321: power consuming device, 322: FB, 323: placement unit, 325: exchange information, 330: power supplier, 331: power production device, 332: power storage device, 333: placement unit, 340: power consumer, 343: placement unit, 345: exchange information, 350: power consumer, 360: power supplier, 370: power consumer, 400: terminal, 402: exchange information acquiring unit, 404: receiver determination unit, 406: mobile object controlling unit, 420: terminal, 440: terminal, 500: aggregator, 1000: computer, 1010: CPU, 1020: ROM, 1030: RAM, 1040: communication I/F, 1050: hard disk drive, 1070: DVD drive, 1072: DVD-ROM, 1080: input/output chip, 1085: graphics controller, 1090: display, 1092: host controller, 1094: input/output controller

What is claimed is:

1. An energy system comprising:
a first placement unit for removably placing a mobile energy storage device capable of storing energy or energy sources;
a second placement unit for removably placing the mobile energy storage device;
a third placement unit for removably placing the mobile energy storage device;
a processor for aggregating energy supply-and-demand, the processor communicably connected to: a first energy consumer having the first placement unit and a first energy consuming device for consuming energy; a second energy consumer having the second placement unit and a second energy consuming device; and an energy supplier having at least any of an energy generation device for generating energy or energy sources and an energy storage device for storing energy or energy sources, and the third placement unit; wherein the aggregating energy supply-and-demand comprises:
acquiring a first exchange information including information about a cost or a loss in a case that the energy supplier and the first energy consumer exchange energy; and a second exchange information including information about a cost or a loss in a case that the energy supplier and the second energy consumer exchange energy or energy sources; and
determining an energy receiver that receives energy or energy sources via the mobile energy storage device, based on the acquired first exchange information and the acquired second exchange information; and
a mobile object for autonomously moving with the mobile energy storage device loaded thereon, so as to remove the mobile energy storage device from the third placement unit and place the mobile energy storage device on the second placement unit, when determining the second energy consumer as the energy receiver.

2. The energy system according to claim 1, wherein
the first placement unit is for removably placing a mobile power storage device capable of storing electric power;
the second placement unit is for removably placing the mobile power storage device;
the third placement unit is for removably placing the mobile power storage device;
the processor further comprises
aggregating power supply-and-demand communicably connected to: a first power consumer having the first placement unit and a first power consuming device for consuming electric power; a second power consumer having the second placement unit and a second power consuming device; and a power supplier having at least any of a power generation device for generating electric power and a power storage device for storing electric power, and the third placement unit;
acquiring the first exchange information including information about a cost or a loss in a case that the power supplier and the first power consumer exchange electric power; and the second exchange information including information about a cost or a loss in a case that the power supplier and the second power consumer exchange electric power;
determining a power receiver that receives electric power via the mobile power storage device, based on the first exchange information and the second exchange information which are acquired by the processor; and
the mobile object is for autonomously moving with the mobile power storage device loaded thereon, so as to remove the mobile power storage device from the third placement unit and place the mobile power storage device on the second placement unit, when the unit processor determines the second power consumer as the power receiver.

3. The energy system according to claim 2, wherein
the first exchange information includes information about a cost or a loss in a case that the power supplier and the first power consumer exchange electric power via the mobile power storage device; and
the second exchange information includes information about a cost or a loss in a case that the power supplier and the second power consumer exchange electric power via the mobile power storage device.

4. The energy system according to claim 2, wherein
the first exchange information includes first consideration-for-reception information indicating consideration that the first power consumer pays when receiving electric power; and
the second exchange information includes second consideration-for-reception information indicating consideration that the second power consumer pays when receiving electric power.

5. The energy system according to claim 2, wherein the first exchange information and the second exchange information include consideration-for-transfer information indicating consideration that the power supplier receives when transferring electric power.

6. An energy exchange method comprising:
acquiring: first exchange information including information about a cost or a loss in a case that a first energy consumer having a first placement unit for removably placing a mobile energy storage device capable of storing energy or energy sources and a first energy consuming device for consuming energy, and an energy supplier having at least any of an energy generation device for generating energy or energy sources and an energy storage device for storing energy or energy sources, and a third placement unit for removably placing the mobile energy storage device, exchange energy or energy sources; and second exchange information including information about a cost or a loss in a case that a second energy consumer having a second placement unit for removably placing the mobile energy storage device and a second energy consuming device and the energy supplier exchange energy or energy sources;
when determining the second energy consumer as an energy receiver that receives energy or energy sources via the mobile energy storage device, based on the first exchange information and the second exchange information;
causing a mobile object for autonomously moving with the mobile energy storage device loaded thereon, to remove the mobile energy storage device from the third placement unit; and
causing the mobile object to place the mobile energy storage device on the second placement unit.

7. An energy exchange method comprising:
providing exchange information including information about a cost or a loss in a case that energy or energy sources are exchanged, to an energy supplier having at least any of an energy generation device for generating energy or energy sources and an energy storage device for storing energy or energy sources, and a placement unit for removably placing a mobile energy storage device capable of storing energy or energy sources, or an energy aggregator that aggregates supply-and-demand of energy or energy sources; and
accepting, from a mobile object, the mobile energy storage device removed from the placement unit of the energy supplier by the mobile object for autonomously moving with the mobile energy storage device loaded thereon, in response to a target which receives energy or energy sources via the mobile energy storage device having been determined based on the exchange information;
when a determination is made that the target should receive energy or energy sources via the mobile energy storage device.

8. An energy exchange method comprising:
acquiring, by an energy supplier having at least any of an energy generation device for generating energy or energy sources and an energy storage device for storing energy or energy sources, and a supplier placement unit for removably placing a mobile energy storage device capable of storing energy or energy sources, first exchange information including information about a cost or a loss in a case that the first energy consumer and the energy supplier exchange energy or energy sources, from a first energy consumer having a first placement unit for removably placing the mobile energy storage device and a first energy consuming device for consuming energy;
acquiring, by the energy supplier, second exchange information including information about a cost or a loss in a case that the second energy consumer and the energy supplier exchange energy or energy sources, from a second energy consumer having a second placement unit for removably placing the mobile energy storage device and a second energy consuming device;
determining, by the energy supplier based on the first exchange information and the second exchange information, the second energy consumer as a target that receives energy or energy sources via the mobile energy storage device;
causing, by the energy supplier, a mobile object for autonomously moving with the mobile energy storage device loaded thereon, to remove the mobile energy storage device from the supplier placement unit; and
causing, by the energy supplier, the mobile object to place the mobile energy storage device on the second placement unit.

9. A server comprising one or more processors for:
acquiring first exchange information including information about a cost or a loss in a case that a first energy consumer having a first placement unit for removably placing a mobile energy storage device capable of storing energy or energy sources and a first energy consuming device for consuming energy, and an energy supplier having at least any of an energy generation device for generating energy or energy sources and an energy storage device for storing energy or energy sources, and a third placement unit for removably placing the mobile energy storage device, exchange energy or energy sources; and second exchange information including information about a cost or a loss in a case that a second energy consumer having a second placement unit for removably placing the mobile energy storage device and a second energy consuming device and the energy supplier exchange energy or energy sources;
determining an energy receiver that receives energy or energy sources via the mobile energy storage device, based on the first exchange information and the second exchange information; and
causing a mobile object for autonomously moving with the mobile energy storage device loaded thereon, to remove the mobile energy storage device from the third placement unit and place the mobile energy storage device on the second placement unit, when the second energy consumer is determined as the energy receiver.

10. A mobile object for autonomously moving with a mobile energy storage device loaded thereon, so as to remove the mobile energy storage device from a third placement unit and place the mobile energy storage device on a second placement unit, when a second energy consumer is determined as an energy receiver that receives energy or energy sources via the mobile energy storage device, based on:
first exchange information including information about a cost or a loss in a case that a first energy consumer having a first placement unit for removably placing the mobile energy storage device capable of storing energy or energy sources and a first energy consuming device for consuming energy, and an energy supplier having at least any of an energy generation device for generating energy or energy sources and an energy storage device for storing energy or energy sources, and the third placement unit for removably placing the mobile energy storage device, exchange energy or energy sources; and second exchange information including information about a cost or a loss in a case that the second energy consumer having the second placement unit for removably placing the mobile energy storage device and a second energy consuming device, and the energy supplier, exchange energy or energy sources.

11. An energy system comprising a first placement unit for removably placing a mobile energy storage device capable of storing energy or energy sources, the first placement unit is for removably placing a mobile power storage device capable of storing electric power;

a second placement unit for removably placing the mobile energy storage device, the second placement unit is for removably placing the mobile power storage device;

a processor for acquiring an abnormality on an energy path used for energy exchange, the energy path built between a first energy consumer having the first placement unit and a first energy consuming device for consuming energy, and a second energy consumer having the second placement unit and a second energy consuming device; and a mobile object for autonomously moving with the mobile energy storage device loaded thereon, so as to remove the mobile energy storage device from the first placement unit and place the mobile energy storage device on the second placement unit, if the processor acquires the abnormality when the mobile energy storage device is placed on the first placement unit, and the processor for acquiring an abnormality on a power line used for power exchange, the power line built between a first power consumer having the first placement unit and a first power consuming device for consuming electric power, and second power consumer having the second placement unit and a second power consuming device; and the mobile object is for autonomously moving with the mobile power storage device loaded thereon, so as to remove the mobile power storage device from the first placement unit and place the mobile power storage device on the second placement unit, if the processor acquires an abnormality when the mobile power storage device is placed on the first placement unit.

12. The energy system according to claim 11, wherein the first power consumer comprises a stationary power storage device settled in the first power consumer, rather than the mobile power storage device.

13. The energy system according to claim 11, wherein the mobile object moves with the mobile power storage device loaded thereon, in a disconnected condition where the energy system is not connected to an utility grid.

14. An energy exchange method comprising:

acquiring an abnormality on an energy path used for energy exchange, the energy path used for energy exchange built between a first energy consumer having a first placement unit for removably placing a mobile energy storage device capable of storing energy or energy sources and an first energy consuming device for consuming energy, and a second energy consumer having a second placement unit for removably placing the mobile energy storage device and a second energy consuming device;

causing a mobile object for autonomously moving with the mobile energy storage device loaded thereon, to remove the mobile energy storage device from the first placement unit, in response to the abnormality is acquired when the mobile energy storage device is placed on the first placement unit; and causing the mobile object to place the mobile energy storage device on the second placement unit.

* * * * *